(12) United States Patent
Vadlakonda et al.

(10) Patent No.: US 7,680,047 B2
(45) Date of Patent: Mar. 16, 2010

(54) MAXIMUM TRANSMISSION UNIT TUNING MECHANISM FOR A REAL-TIME TRANSPORT PROTOCOL STREAM

(75) Inventors: Sravan Vadlakonda, Sunnyvale, CA (US); Son D. Nguyen, San Jose, CA (US); Manjunath S. Bangalore, San Jose, CA (US); Vikram Khurana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/284,483

(22) Filed: Nov. 22, 2005

(65) Prior Publication Data

US 2007/0115963 A1    May 24, 2007

(51) Int. Cl.
*H04J 1/16* (2006.01)
(52) U.S. Cl. .................. 370/235; 370/389; 370/230.1
(58) Field of Classification Search ............ 370/236, 370/252, 235, 230.1, 389
See application file for complete search history.

(56) References Cited

U.S. PATENT DOCUMENTS

| | | | |
|---|---|---|---|
| 5,483,587 | A | 1/1996 | Hogan et al. |
| 5,600,366 | A | 2/1997 | Schulman |
| 5,673,253 | A | 9/1997 | Shaffer |
| 5,729,687 | A | 3/1998 | Rothrock et al. |
| 5,917,830 | A | 6/1999 | Chen et al. |
| 5,963,217 | A | 10/1999 | Grayson et al. |
| 6,137,834 | A | 10/2000 | Wine et al. |
| 6,141,324 | A | 10/2000 | Abbott et al. |
| 6,236,854 | B1 | 5/2001 | Bradshaw |

(Continued)

FOREIGN PATENT DOCUMENTS

| | | |
|---|---|---|
| EP | 1 553 735 A1 | 7/2005 |
| WO | WO 00/19693 A1 | 4/2000 |
| WO | WO 2005/093661 | 10/2005 |

OTHER PUBLICATIONS

Ott et al.; Extended RTP Profile for RTCP-based feedback (RTP/AVPF); 2002;RFC; pp. 1-43.*

(Continued)

*Primary Examiner*—Ricky Ngo
*Assistant Examiner*—Dewanda Samuel
(74) *Attorney, Agent, or Firm*—The Law Offices of Bradley J. Bereznak

(57) ABSTRACT

A Real-Time Protocol (RTP) source node of a network operates to send a first data packet of a first size to a destination node over a path of the network that includes a plurality of intermediate nodes, at least one of the intermediate nodes having a maximum transmission unit (MTU) size smaller than the first size such that fragmentation of the first data packet occurs. The destination node sends back to the source node a RTCP report that includes a number of fragments received and a largest minimum data packet size. In response, the source node sends subsequent data packets having a second size less than or equal to the largest data packet size of the fragments. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 4 Drawing Sheets

U.S. PATENT DOCUMENTS

| | | | |
|---|---|---|---|
| 6,269,107 | B1 | 7/2001 | Jong |
| 6,332,153 | B1 | 12/2001 | Cohen |
| 6,501,739 | B1 | 12/2002 | Cohen |
| 6,505,169 | B1 | 1/2003 | Bhagavath et al. |
| 6,570,926 | B1 | 5/2003 | Agrawal et al. |
| 6,608,820 | B1 | 8/2003 | Bradshaw |
| 6,624,841 | B1 | 9/2003 | Buchner |
| 6,643,496 | B1* | 11/2003 | Shimoyama et al. ......... 455/69 |
| 6,650,652 | B1* | 11/2003 | Valencia .................... 370/433 |
| 6,671,262 | B1 | 12/2003 | Kung et al. |
| 6,675,216 | B1 | 1/2004 | Quatrano et al. |
| 6,718,553 | B2 | 4/2004 | Kenworthy |
| 6,735,572 | B2 | 5/2004 | Landesmann |
| 6,744,785 | B2 | 6/2004 | Robinett et al. |
| 6,771,657 | B1 | 8/2004 | Elstermann |
| 6,775,247 | B1 | 8/2004 | Shaffer et al. |
| 6,816,469 | B1 | 11/2004 | Kung et al. |
| 6,876,734 | B1 | 4/2005 | Summers et al. |
| 6,865,540 | B1 | 8/2005 | Faber et al. |
| 6,925,068 | B1 | 8/2005 | Stanwood et al. |
| 6,931,001 | B2 | 8/2005 | Deng |
| 6,931,113 | B2 | 8/2005 | Ortel |
| 6,937,569 | B1 | 8/2005 | Sarkar et al. |
| 6,956,600 | B1 | 10/2005 | Gaylord |
| 6,956,828 | B2 | 10/2005 | Simard et al. |
| 6,959,075 | B2 | 10/2005 | Cutaia et al. |
| 6,976,055 | B1 | 12/2005 | Shaffer et al. |
| 6,989,856 | B2 | 1/2006 | Firestone et al. |
| 7,003,086 | B1 | 2/2006 | Shaffer et al. |
| 7,007,098 | B1 | 2/2006 | Smyth et al. |
| 7,084,898 | B1 | 8/2006 | Firestone et al. |
| 7,127,487 | B1 | 10/2006 | Wang et al. |
| 7,209,763 | B2 | 4/2007 | Martin et al. |
| 7,379,653 | B2 | 5/2008 | Yap et al. |
| 2001/0000540 | A1 | 4/2001 | Cooper et al. |
| 2002/0004841 | A1* | 1/2002 | Sawatari .................... 709/232 |
| 2002/0006165 | A1 | 1/2002 | Kato |
| 2002/0014282 | A1 | 2/2002 | Andersson et al. |
| 2002/0052214 | A1 | 5/2002 | Maggenti et al. |
| 2002/0087976 | A1 | 7/2002 | Kaplan et al. |
| 2002/0163918 | A1* | 11/2002 | Cline ......................... 370/399 |
| 2003/0016632 | A1 | 1/2003 | Refai et al. |
| 2003/0025786 | A1 | 2/2003 | Norsworthy |
| 2003/0076850 | A1 | 4/2003 | Jason, Jr. |
| 2003/0198195 | A1 | 10/2003 | Li |
| 2004/0057449 | A1 | 3/2004 | Black |
| 2004/0165527 | A1* | 8/2004 | Gu et al. .................... 370/229 |
| 2004/0165710 | A1 | 8/2004 | DelHoyo et al. |
| 2004/0199659 | A1* | 10/2004 | Ishikawa et al. ............ 709/235 |
| 2004/0213152 | A1 | 10/2004 | Matuoka et al. |
| 2004/0250201 | A1 | 12/2004 | Caspi |
| 2004/0255328 | A1 | 12/2004 | Baldwin et al. |
| 2005/0069102 | A1 | 3/2005 | Chang |
| 2005/0078171 | A1 | 4/2005 | Firestone et al. |
| 2005/0081244 | A1 | 4/2005 | Barett et al. |
| 2005/0138372 | A1* | 6/2005 | Kajihara et al. ............. 713/165 |
| 2005/0259803 | A1 | 11/2005 | Khartabil |
| 2006/0020995 | A1 | 1/2006 | Opie et al. |
| 2006/0072672 | A1 | 4/2006 | Holcomb et al. |
| 2006/0104458 | A1 | 5/2006 | Kenoyer |
| 2006/0146734 | A1 | 7/2006 | Wenger et al. |
| 2006/0189337 | A1 | 8/2006 | Farrill et al. |
| 2006/0206617 | A1* | 9/2006 | Rey et al. ................... 709/231 |
| 2006/0259755 | A1 | 11/2006 | Kenoyer |
| 2007/0110029 | A1 | 5/2007 | Gilmore, II et al. |
| 2007/0123284 | A1 | 5/2007 | Schliwa-Bertling et al. |
| 2007/0133435 | A1 | 6/2007 | Eneroth et al. |
| 2008/0043140 | A1 | 2/2008 | Herpel et al. |

OTHER PUBLICATIONS

Friedman et al.; "RTP Control Protocol Extended Reports (RTCP XR)"; Network Working Group; 2003; pp. 1-55.*

Joerg Ott et al.; "Extended RTP Profile for RTCP-based feedback (RTP/AVPF)"; Jun. 29, 2002; RCF; pp. 1-43 http://www.ietf.org/proceedings/01dec/I-D/draft-ietf-avt-rtcp-feedback-01.txt.

T. Friedman et al.; "RTP Control Protocol Extended Reports (RTCP XR)"; Network Working Group; Nov. 2003; pp. 1-55 http://www.ietf.org/rfc/rfc3611.txt.

* cited by examiner

MAXIMUM TRANSMISSION UNIT TUNING MECHANISM FOR A REAL-TIME TRANSPORT PROTOCOL STREAM

FIELD OF THE INVENTION

The present invention relates generally to the field of audio/video data packet transmission over digital networks; more specifically, to mechanisms for minimizing or eliminating fragmentation in real-time data traffic over a network.

BACKGROUND OF THE INVENTION

In the past few decades, advances in the related fields of video compression and video transmission systems have lead to the widespread availability of digital video programs transmitted over a variety of communication systems and networks. Most recently, new technologies have been developed that have allowed audio and video programs to be transmitted as multicast digital bitstreams of multiplexed video and audio signals delivered to users or client subscribers over packet switched Internet Protocol (IP).networks.

IP multicasting is defined as the transmission of an IP datagram (i.e., a data packet formatted according to the Internet Protocol) to a "host group", which is a set of hosts identified by a single IP destination address. A multicast datagram is asymmetrically delivered to all members of its destination host group. The Internet Group Management Protocol (IGMP), which is defined in RFC792, is used between IP hosts and their immediate neighbor multicast agents to support the creation of transient groups, the addition and deletion of members of a group, and the periodic confirmation of group membership. Multicast data streams are typically sent using the User Datagram Protocol (UDP), which is implemented in the transport layer and provides a connectionless datagram service for the delivery of packets.

By way of further background, U.S. Pat. No. 6,771,644 teaches a system and method for supporting audio/video program insertion in real-time IP multicasts. Scheduling and control traffic occurs through a new protocol wherein smooth transitions occur by manipulation of the Real-Time Protocol (RTP) header in the packets and the associated RTP Control Protocol (RTCP) stream. RTP is a known protocol for transmitting real-time data such as audio or video streams. While it does not guarantee real-time delivery of data, RTP does provide mechanisms for sending and receiving applications to support data streaming. RTCP, on the other hand, relies on the periodic transmission of control packets from the endpoints to the originator of the data (media) stream using the same distribution mechanism—but not necessarily the same path—as the data packets. A method and system for providing media services in voice over IP (VoIP) telephony in which audio is transmitted in packet streams such as RTP/RTCP packets is disclosed in U.S. Pat. No. 6,947,417. U.S. Pat. No. 6,044,081 teaches a communications system and multimedia system that allows private network signaling to be routed over a packet network.

In video streaming applications, MPEG video streams comprise different types of frames that do not include all of the data to be displayed at any given time. For instance, Inter-frames, or I-frames, are the only type of frame that is not coded with reference to any other frame; P-frames are coded predicatively from a previous I-frame or P-frame; B-frames are coded predicatively from I-frames and P-frames. In order to be properly decoded, a B-frame associated with a group of pictures ("GOPs") may need to reference the I-frame of a next GOP. Due to their comprehensive nature, I-frames are generally much larger (e.g., 5 Kbytes or more) than either P-frames or B-frames. (It should be understood that a GOP is an optional structure of an elementary stream. Also, in the context of the present application, the term "I-frame" is intended to broadly refer to an Inter-frame and its equivalents, e.g., an IDR frame in the case of H.264.)

For audio/video solutions, RTP streams are typically created between the media server and the endpoints. In the case of video, the RTP packet sizes that include I-frames are often larger than the maximum transmission unit (MTU) size that the intermediate nodes in the network can process. When the RTP packet size exceeds the MTU of a node, the packets usually are fragmented into smaller sized packets. Fragmentation of packets, however, adds latency that slows down video data transmissions and other time-sensitive applications. Therefore, fragmentation of RTP packets should be avoided as much as possible.

In the case where the packet header has the "Don't Fragment" (DF) bit marked, the packet is simply dropped. In accordance with RFC1191, an ICMP notification that the packet has been dropped may be sent back to the source node. Although another attempt may be made to re-send the dropped packet, the RFC1191 mechanism provides no assurance that the resent packet will successfully traverse the network without being fragmented. For instance a large video packet containing an I-frame may be repeatedly re-sent by the source with the DF bit set, but never arrive at the destination. Obviously, this is a serious problem for video streaming traffic which usually must be delivered without delay or interruption. Furthermore, marking video packets with the DF bit will result in loss of packets for certain specifications, such as the H.26x codec standard, which lack a resend mechanism.

In many cases, fragmentation occurs when data packets are passed from one networking layer to another. By way of example, FIG. 1 shows the well-known Open System Interconnection (OSI) model for implementing protocols in seven layers. As can be seen, the OSI model includes an application layer that supports application and end-user processes; a presentation layer that works to transform data into the form that the application can accept; a session layer that establishes, manages and terminates connections between applications; a transport layer that provides transparent transfer of data between end systems; a network layer that creates logical paths called-virtual circuits for transmitting data from node to node; a data link layer responsible for encoding and decoding data packets into bits; and the physical layer that conveys the bit stream through the network at the electrical and mechanical level. Control is passed from one layer to the next, starting at the top (application) layer at the sending computer or node, and proceeding to the bottom (physical) layer, over the channel to the receiving computer or node, and back up the layer hierarchy.

What is needed then is for a solution to the problem of fragmentation of large, time-sensitive data packets, such as audio and video data packets.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A mechanism for optimizing the size of data packets in a stream so that fragmentation of packets does not occur is described. In the following description, numerous specific details are set forth, such as device types, protocols, data sizes, formats, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

Figure 6:
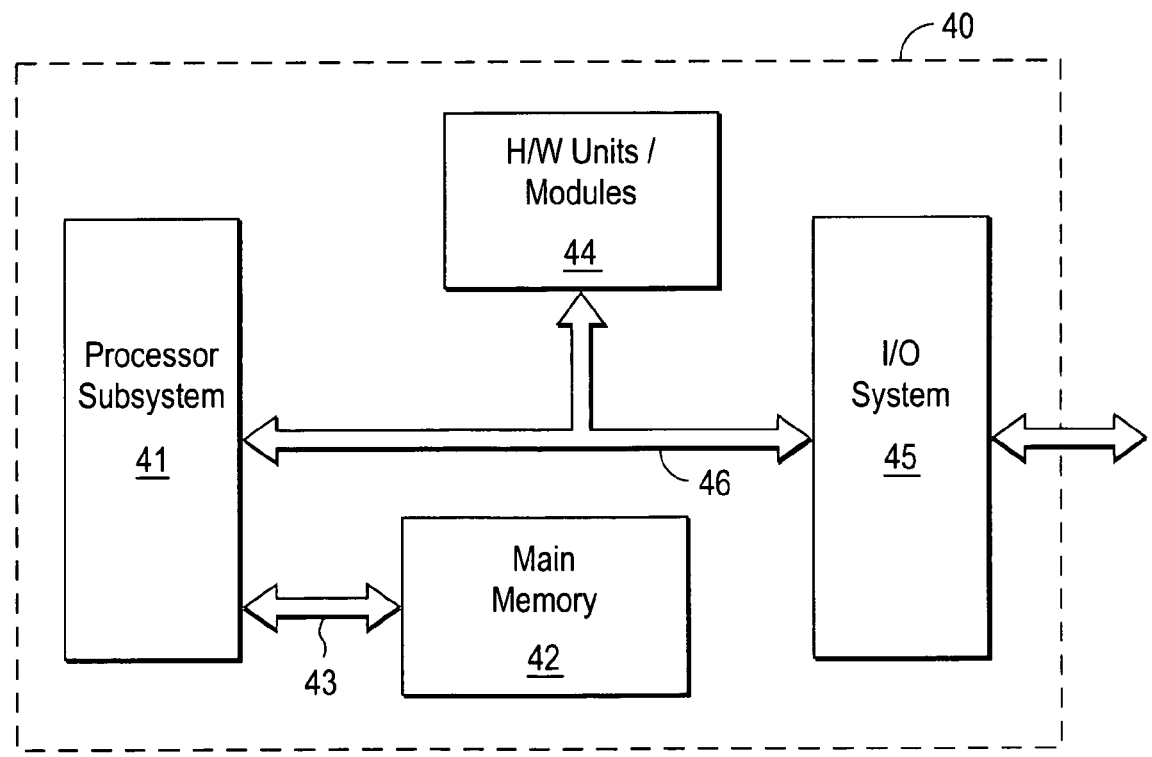
FIG. 6 is a generalized circuit schematic block diagram of a network node.

As shown in FIG. 6, each node 40 typically comprises a number of basic subsystems including a processor subsystem 41, a main memory 42 and an input/output (I/O) subsystem 45. Data is transferred between main memory ("system memory") 42 and processor subsystem 41 over a memory bus 43, and between the processor and I/O subsystems over a system bus 46. Examples of the system bus may include the conventional lightning data transport (or hyper transport) bus and the conventional peripheral component [computer] interconnect (PCI) bus. Node 40 may also comprise other hardware units/modules 44 coupled to system bus 46 for performing additional functions. Processor subsystem 41 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, an extension to the RTCP is utilized to signal back to the RTP originating node the number of fragments received at the destination node (i.e., endpoint) and also the minimum size of the first fragmented packets (the first fragment is marked in the IP header of a fragment received). The minimum size of the received packet (typically greater than 576 bytes) signifies the general preference of the network at that particular point in time to ensure that subsequently sent RTP packets in the data stream are not fragmented. In other words, the information conveyed in the RTCP report is used by the RTP originating or source node to adjust/control the size of the RTP packets subsequently sent across the network. Once the source node has adjusted the packet size and then receives a RTCP report back from the destination node indicating no fragmentation occurred in the previous transmission, the source node continues sending RTP packets of that size.

In an alternative embodiment, the node that originates the RTP stream incrementally increases the packet size after a predetermined time or after receipt of a certain number of RTCP reports indicating no fragmentation. For example, in one implementation, after three RTCP reports are received with no packet fragmentation the sending node incrementally sends packets of a slightly larger size (e.g., ~10% larger) until a RTCP report is received indicating fragmentation. At that point, the sender again reduces the size of the packets being sent until RTCP reports are again received indicating no fragmentation. This latter approach permits optimization or dynamic MTU tuning of the network to maximize the size of packets being sent over the network as conditions change (e.g., new routing paths) for the better.

Figure 1:
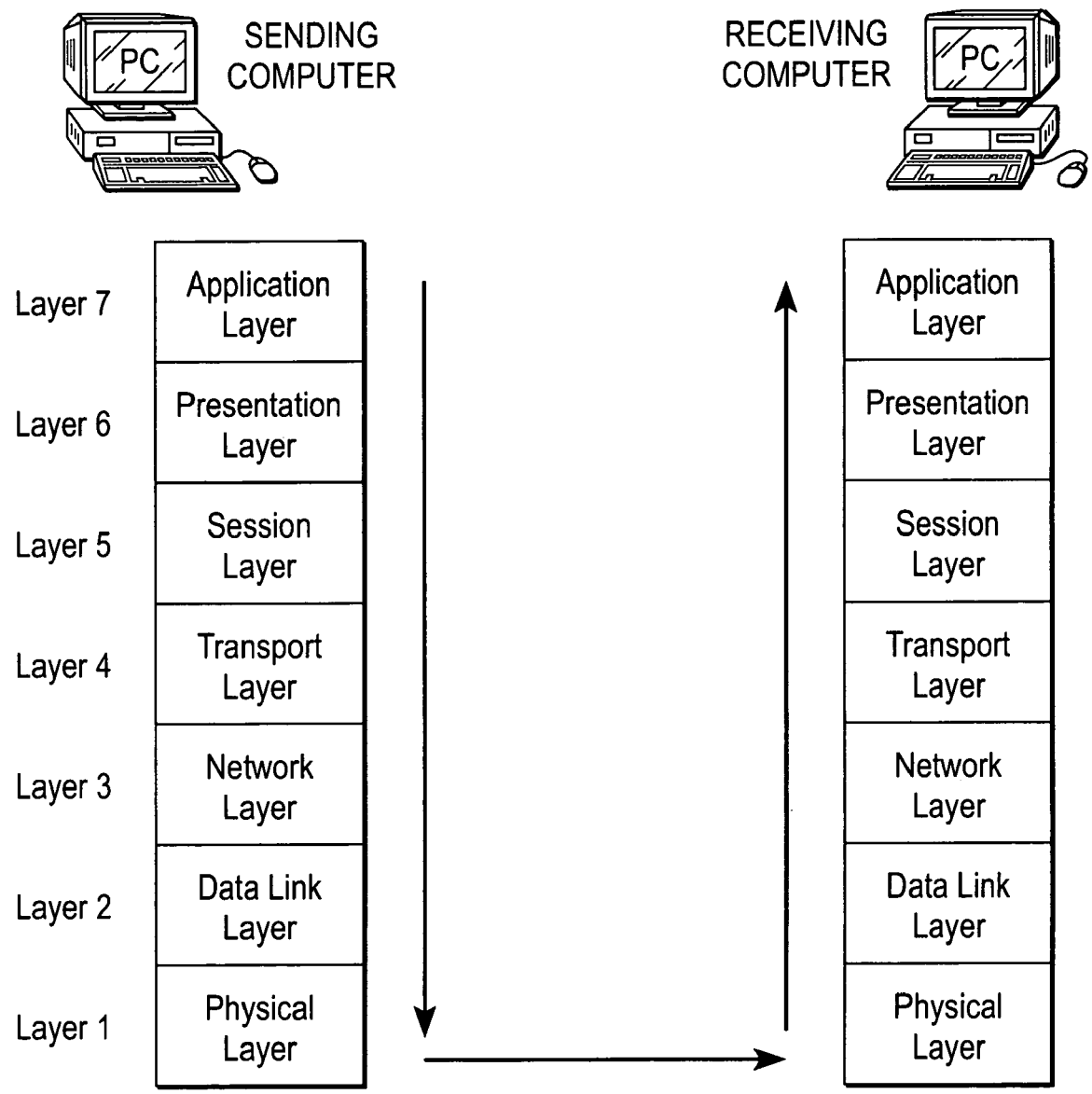
FIG. 1 is a diagram of the prior art OSI networking model.
Figure 2:
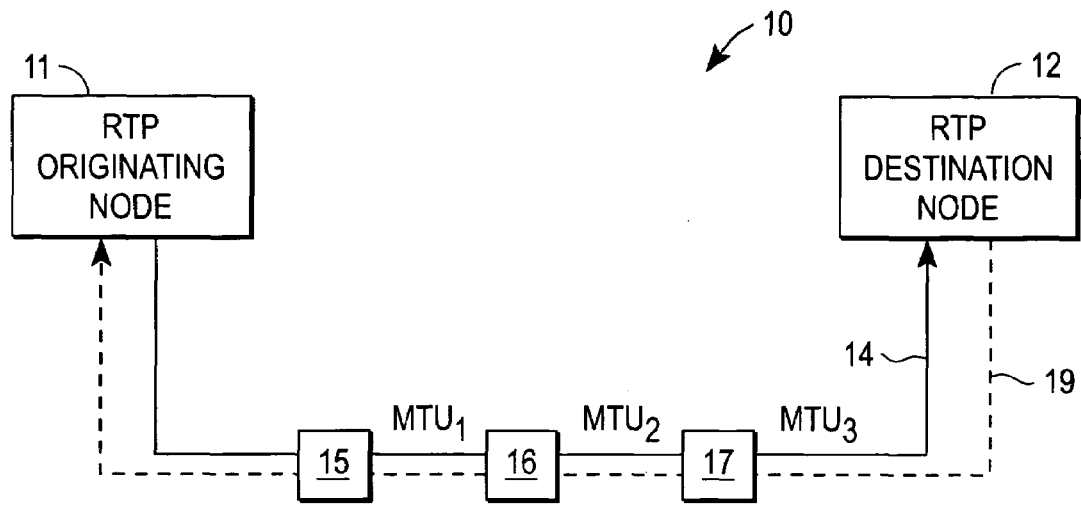
FIG. 2 is a network diagram illustrating RTP/RTCP transmissions in accordance with one embodiment of the present invention.
Figure 3:
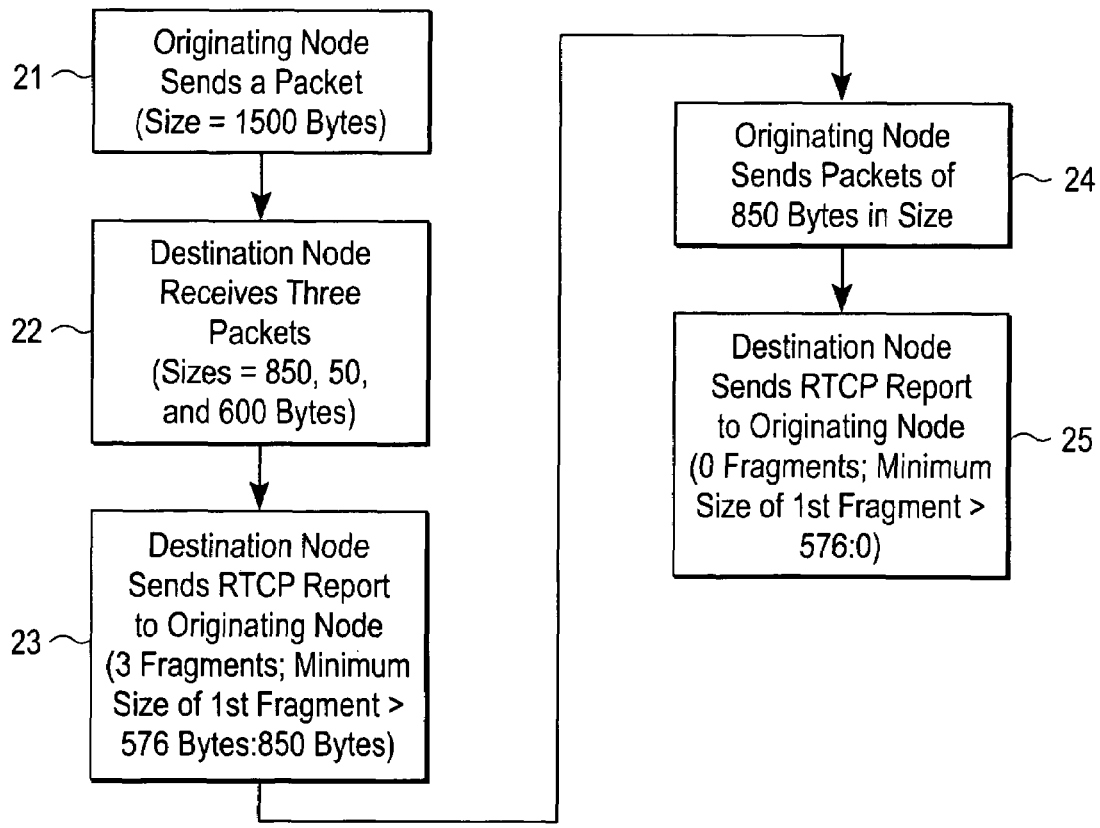
FIG. 3 is a flowchart that illustrates an exemplary method of operation in accordance with one embodiment of the present invention.

With reference now to FIG. 2, an RTP data packet stream 14 is shown being transmitted from a RTP originating (source) node 11 to a RTP destination (endpoint) node 12 through a path of network 10 that includes intermediate nodes 15-17. RTP originating node 11 may comprise a provider edge (PE) node, a customer edge (CE) node, an endpoint, or any other network node/device that is capable of functioning as the source of a RTP data packet stream. Similarly, destination node 12 may comprise any type of node or network device capable of terminating or receiving an RTP stream.

In one implementation, both nodes 11 & 12 run software (or firmware) which implements an extension to RTCP that permits communication of the number of fragments received by the destination, as well as the minimum size of the first fragment greater than a predetermined size (e.g., 576 bytes). In the example of FIG. 2, the RTCP reports are indicated by dashed line 19 from destination node 19 to originating node 11 along the identical path taken by RTP stream 14. Practitioners in the arts will appreciate that the RTCP report path 19 through network 10 may differ from the path of RTP stream 14. That is, the RTCP reports may be communicated via a completely different network path as compared to that of the RTP data packet stream.

FIG. 2 is a flowchart that illustrates the operation of network 10 according to one embodiment of the present invention. In the example of FIG. 2, node 11 initially sends a packet of size=1500 bytes (block 21) destined for node 12 over a network path that includes intermediate nodes 15-17. The $MTU_1$ of intermediate node 15 is indicated as being 850 bytes, the $MTU_2$ of intermediate node 16 is 900 bytes, and the $MTU_3$ of intermediate node 17 is 1500 bytes. Instead of receiving one packet of size=1500 bytes, destination node 12 receives three packets: a first packet of size=850 bytes, a second packet of size=50 bytes, and a third packet of size=600 bytes. In other words, the MTU limitations of the intermediate nodes caused fragmentation of the single, large 1500 byte packet into three smaller packets (block 22).

After receiving the three packet fragments, destination node 12 utilizes an extension to RTCP to send a report back to sending node 11 along path 19 indicating that three fragments were received, with the minimum size of the first fragment greater than 576 bytes being equal to 850 bytes (block 23). It should be understood that the 576 byte number simply represents a predetermined threshold or minimum MTU that the network ordinarily should support. In other words, the threshold or minimum MTU number may vary substantially based on network type and/or configuration details. In an alternative embodiment, the RTCP report may simply contain the size of the largest packet fragment received.

RTP originating node 11 responds to the RTCP report by reducing the size of the data packets it sends over the network. In this example, originating node 11 responds to the RTCP report by subsequently sending data packets of size=850 bytes (block 24). Since the 850 byte data packet size is less than or equal to the smallest MTU of intermediate nodes 15-17, no fragmentation occurs for this network path. Consequently, RTP destination node 12 sends RTCP reports back to RTP originating node 11 indicating no fragmentation (block 25). In other words, the mechanism of the present invention eliminates fragmentation in an RTP data stream (e.g., audio and/or video data packets).

Figure 4:
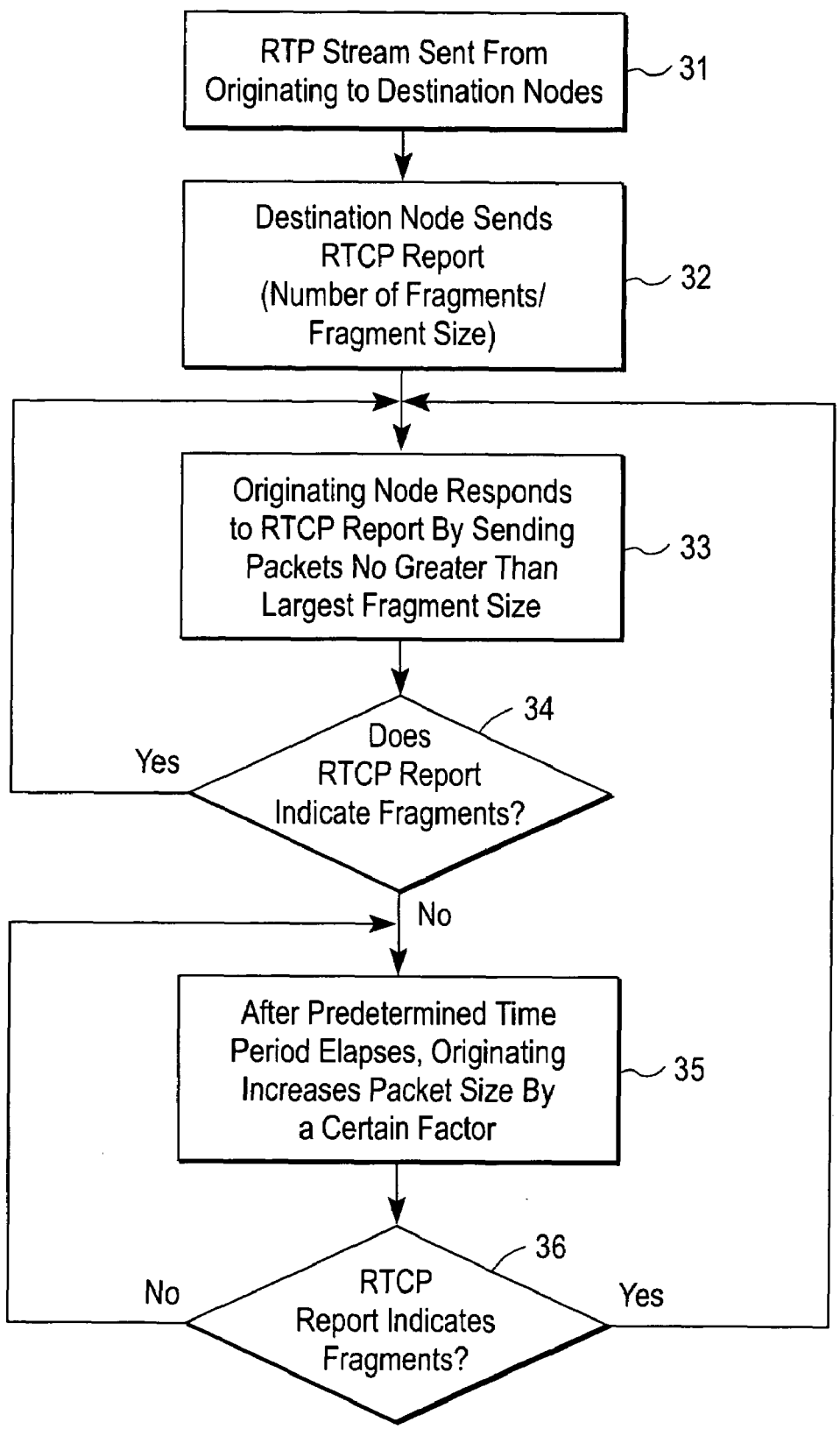
FIG. 4 is a flowchart that illustrates an method of operation in accordance with another embodiment of the present invention.

FIG. 4 is a flowchart that illustrates an alternative embodiment of the present invention in which the RTP data stream is gradually refined and dynamically optimized as network conditions change over time. The illustration of FIG. 4 begins at block 31 with the RTP stream being sent from the originating node to the destination node across a path of the network that includes one or more intermediate nodes. When the data packets are received, the destination node responds by sending a RTCP report back to the source or originating node. As described above, the RTCP report includes information that includes the number of fragments and fragment size (block 32). The originating node responds to the information contained in the RTCP report by modifying the size of the packets sent over the network so as to insure no fragmentation occurs (block 33).

The process continues with the destination node continuing to send RTCP reports back indicating fragmentation or no fragmentation (block 34). If there is no fragmentation, the sending node continues with the packet size previously sent. In the embodiment shown, the sending node incrementally increases the size of the data packets over time until a RTCP report is received indicating fragmentation. For example, the originating node may increase the data packet size by a factor of ~10% after three consecutive RTCP reports have been received indicating no fragmentation (block 35). In the case of streaming video, RTCP reports may be sent every five seconds, meaning that the originating node may adjust the RTP video stream approximately every 10 to 15 seconds.

The sending or originating node continues to increment the data packet size until an RTCP report is received from the destination node that indicates fragmentation has occurred (block 36). At that point, the sending node reduces the size of the packets being sent to eliminate fragmentation. That is, the datagram size is reduced to the largest size that does not require fragmentation anywhere along the current path across the network from source to destination. This entire process continues for the duration of the data stream. In other words, dynamic optimization of the packet size takes place on a per stream basis to reduce latency in the delivery of real time traffic regardless of the path the RTP traffic might traverse.

Figure 5:
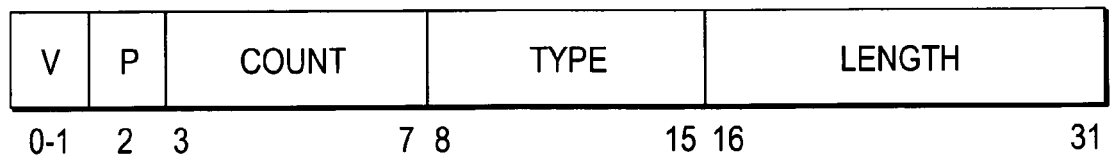
FIG. 5 illustrates a RTCP header format.

FIG. 5 illustrates RTCP header fields of an RTCP packet containing report information in accordance with one embodiment of the present invention. As can be seen, the header includes a two-bit version (V) field, a padding (P) bit, a count field that indicates the number of reception report blocks contained in the packet, a RTCP packet type field, and a 16-bit length field that indicates the length of the RTCP packet. The type field may be set to specify an Extended Report (XR), i.e., RTCP extension, packet type. The RTCP Extended Report packet type is defined in RFC3611, which specifies how the extended reporting format may be used to convey information that supplements the standard RTCP reports. In accordance with one embodiment of the present invention the extended report capability is utilized to convey the number of fragments and the minimum fragment size (>a predetermined size) information back to the originating node.

Practitioners in the networking and multicasting arts will appreciate that the embodiments described above are transparent to the client devices. That is, no changes are required to existing client STBs in order to implement the system and methods of the present invention. The present invention is not limited to video applications but may also be useful to other communication technologies.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Elements of the present invention may be downloaded as a computer program product, wherein the program may be transferred from a remote computer (e.g., a server) to a requesting computer by way of data signals embodied in a carrier wave or other propagation medium via a communication link (e.g., a modem or network connection).

Furthermore, although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method of operation for a Real-Time Protocol (RTP) source node of a network, the method comprising:
   sending, the RTP source node, a first data packet of a first size to a destination node over a path of the network that includes a plurality of intermediate nodes, at least one of the intermediate nodes having a maximum transmission unit (MTU) size smaller than the first size such that fragmentation of the first data packet occurs;
   receiving, by the RTP source node, a RTP Control Protocol (RTCP) report from the destination node, the RTCP report which comprises an RTCP Extended Report data packet type containing information that includes a number of fragments received and a largest data packet size; and
   sending, by the RTP source node, subsequent data packets having a second size less than or equal to the largest data packet size.

2. The method of claim 1 wherein the largest data packet size is greater than a predetermined data packet size.

3. The method of claim 1 further comprising incrementing the second size of the subsequent date packets by a certain amount after a predetermined time elapses.

4. A method of operation for a Real-Time Protocol (RTP) destination node of a network, the method comprising:
   receiving a first data packet of a first size as a plurality of data packet fragments, each of the data packet fragments having a size smaller than the first size due to fragmentation of the first data packet by one or more intermediate nodes of the network, the first data packet being sent over the network by a RTP source node;
   sending a RTP Control Protocol (RTCP) report back to the RTP source node, the RTCP report containing information that includes a number of the data packet fragments received and a largest data packet size of the data packet fragments; and
   receiving subsequent data packets sent by the RTP source node having a second size less than or equal to the largest data packet size.

5. The method of claim 4 wherein the RTCP report comprises an RTCP Extended Report data packet type.

6. The method of claim 4 wherein the largest data packet size is greater than a predetermined data packet size.

7. A node of a network for originating a Real-Time Protocol (RTP) data packet stream comprising:
   an interface coupled to the network;
   a processor operable to send via the interface a first data packet of a first size to a RTP destination node over the network, the processor being further operable to receive a RTP Control Protocol (RTCP) report from the destination node, the RTCP report containing information indicating that the first data packet was received as a plurality of fragments, the information including a number of the fragments received and a largest data packet size of the fragments, in response to the RTCP report the processor sending subsequent data packets to the RTP destination node over the network, the subsequent data packets having a second size less than or equal to the largest data packet size;
   wherein the processor is further operable to increment the second size of the subsequent data packets after a certain number of RTCP reports are received indicating no fragmentation.

8. The node of claim 7 wherein the RTCP report comprises an RTCP Extended Report data packet type.

9. The node of claim 7 wherein the largest data packet size is greater than a predetermined data packet size.

10. A node of a network comprising:
    an interface coupled to the network;
    a processor operable to receive via the interface a first Real-Time Protocol (RTP) data packet sent by a RTP source node over the network, the processor being further operable to send a RTP Control Protocol (RTCP) report back to the RTP source node over the network, the RTCP report comprising an RTCP Extended Report data packet type that contains information indicating that the first data packet was received as a plurality of fragments, the information including a number of the fragments received and a largest data packet size of the fragments.

11. The node of claim 10 wherein the largest data packet size is greater than a predetermined data packet size.

12. A node of a network for originating a Real-Time Protocol (RTP) data packet stream comprising:
    an interface coupled to the network;
    means for sending via the interface a first data packet of a first size to a destination node over the network via a plurality of intermediate nodes, at least one of the intermediate nodes having a maximum transmission unit (MTU) size smaller than the first size such that the first data packet is fragmented, and for receiving a RTP Control Protocol (RTCP) report from the destination node, the RTCP report comprising an RTCP Extended Report data packet type that contains information which includes a number of the fragments received and a largest data packet size of the fragments, in response to the means sending subsequent data packets to the destination node, the subsequent data packets having a second size less than or equal to the largest data packet size, the means further for incrementally increasing the second size of the subsequent data packets after a time period until another RTCP report is received from the destination node that indicates fragmentation has occurred.

* * * * *